US007299254B2

(12) United States Patent
Alagarsamy et al.

(10) Patent No.: US 7,299,254 B2
(45) Date of Patent: Nov. 20, 2007

(54) BINARY CODED DECIMAL ADDITION

(75) Inventors: Neelamekakannan Alagarsamy, Tamil Nadu (IN); Kulanthaivelu Veluchamy Balamurugan, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/720,940

(22) Filed: Nov. 24, 2003

(65) Prior Publication Data
US 2005/0114423 A1 May 26, 2005

(51) Int. Cl.
*G06F 7/50* (2006.01)
(52) U.S. Cl. .................................... 708/685
(58) Field of Classification Search ............... 708/685
See application file for complete search history.

(56) References Cited

U.S. PATENT DOCUMENTS

| 3,629,565 | A | * | 12/1971 | Schmookler et al. ....... 708/685 |
| 3,935,438 | A | | 1/1976 | Grupe |
| 4,001,570 | A | | 1/1977 | Gooding et al. |
| 4,118,786 | A | * | 10/1978 | Levine et al. ............... 708/685 |
| 4,138,731 | A | | 2/1979 | Kamimoto et al. |
| 4,139,894 | A | * | 2/1979 | Reitsma ...................... 708/714 |
| 4,172,288 | A | | 10/1979 | Anderson |
| 4,559,608 | A | | 12/1985 | Young et al. |
| 4,638,300 | A | | 1/1987 | Miller |
| 4,707,799 | A | | 11/1987 | Ishikawa et al. |
| 4,718,033 | A | | 1/1988 | Miller |
| 4,799,181 | A | | 1/1989 | Tague et al. |
| 4,805,131 | A | | 2/1989 | Adlietta et al. |
| 4,866,656 | A | | 9/1989 | Hwang |
| 5,745,399 | A | * | 4/1998 | Eaton et al. ................ 708/673 |

OTHER PUBLICATIONS

M. Morris Mano and Charles R. Kime, Logic and Computer Design Fundamentals, (2001), pp. 129-132 and 145-147, second edition, Addison Wesley Longman, New Delhi.
John F. Wakerly, Digital Design, Principles and Practices, pp. 441-443, 2001, third edition, Pearson Education Asia, New Delhi.
Zvi Kohavri, Switching and Finite Automata Theory, pp. 138-144, 1978, second edition, Tata McGraw Hill, New Delhi.

* cited by examiner

*Primary Examiner*—D. H. Malzahn
(74) *Attorney, Agent, or Firm*—Anthony V. S. England; William Steinberg

(57) ABSTRACT

The binary coded decimal (BCD) adder circuit adds two BCD encoded operands, with an input carry bit, and produces a BCD encoded sum. The adder has three stages. The first stage receives two BCD encoded operands as inputs, groups the inputs into contiguous blocks of 4-bits each, computes an intermediate sum vector and carry vector without considering the input carry bit, and also computes propagation and generate functions for each 4-bit group. The second stage is a carry look ahead circuit which computes all carries from the input carry, and the propagate and generate functions of the 4-bit groups from the first stage. The third stage adjusts the intermediate sum vector with pre-correction factors which depend upon the input carry and the carries generated from the second stage and the carry vectors from the first stage.

13 Claims, 15 Drawing Sheets

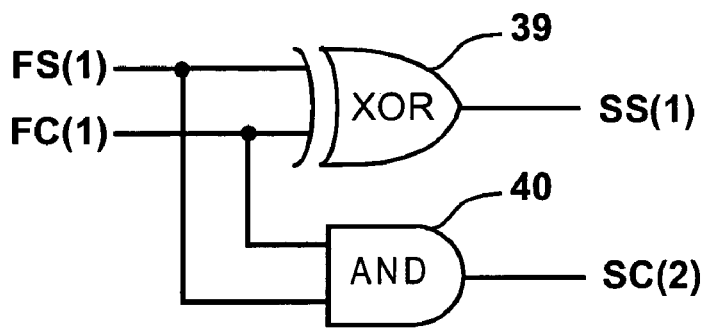
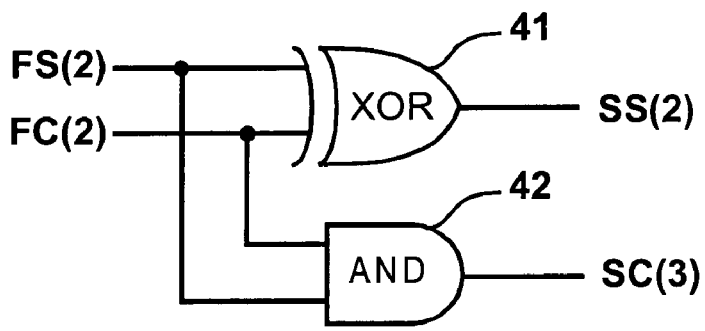
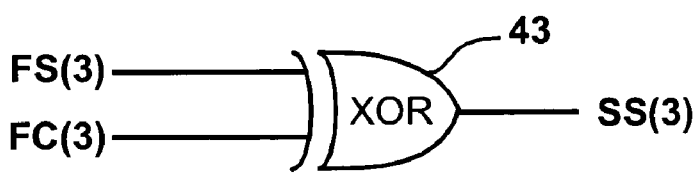
Fig. 5

SS(0) ⟶ TS(0)
SS(1) ⟶ TS(1)
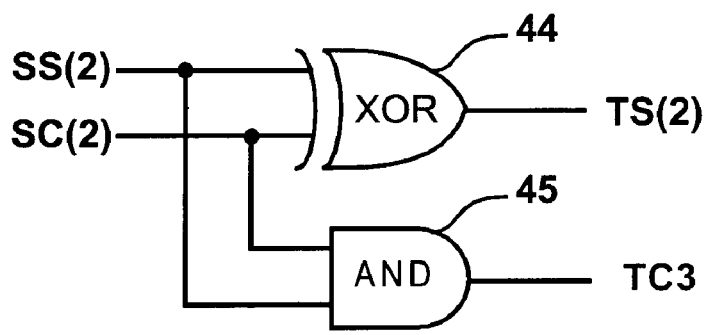
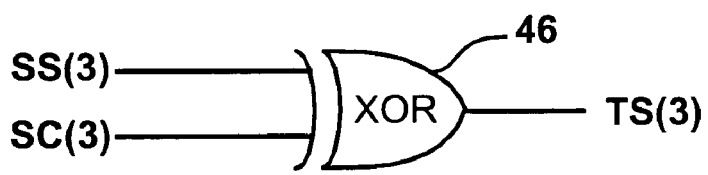
Fig. 6

US 7,299,254 B2

BINARY CODED DECIMAL ADDITION

FIELD OF THE INVENTION

The present invention relates to a binary coded decimal (BCD) addition, including an adder circuit.

BACKGROUND

In BCD arithmetic, at least four binary bits are needed to represent the numbers from 0 to 9. There are sixteen possible bit combinations using four binary bits, but only ten (i.e, 0 to 9) are valid BCD digits. Traditionally, BCD adder circuits adjust the binary sum after the addition has been completed if the value is more than nine (i.e., $1001_2$). For example, whenever the unadjusted sum of two BCD digits produced a carry out (i.e., when the sum exceeds $1001_2$), the sum is corrected by adding $0110_2$.

A known BCD adder, described in "Logic and Computer Design Fundamentals", M Morris Mano and Charles R Kime, Pearson Educational Asia, second edition, 2001 is shown in FIG. 1. The BCD adder circuit 5 uses a four-bit binary adder 6 to add two BCD operands A(3) to A(0) and B(3) to B(0), and an input carry $C_{in}$ to produce an intermediate sum Z(3) to Z(0). The adder circuit 6 also includes two levels of logic gates 7, 8, 9 to calculate the BCD carry output Cout from the intermediate sum. If there is a BCD carry, a correction factor of $0110_2$ is added with the intermediate sum using a further binary adder 10.

The BCD adder circuit 5 shown in FIG. 1 thus uses 10 levels of gates to perform a 4-bit addition. For a 16-bit adder circuit, the corresponding binary adder circuit requires 16 levels of gates. However the critical path is the generation of the carry Cout, and gate levels required to implement this is 22 for 16-bit BCD addition.

Another BCD adder circuit is taught in U.S. Pat. No. 4,805,131 (Adlietta et al, assigned to Digital Equipment Corporation), issued on Feb. 14, 1989. The BCD adder of Adlietta et al has three stages. In the first stage, $0110_2$ is added with the input BCD operands without considering the input carry. In the second stage the sum and carry vectors are added using a carry look ahead network to generate final carry and propagate vectors. In the third stage a correction circuit adds $1010_2$ if needed.

The logic terms in the calculation of a FINAL_CARRY vector increases as the number of bits of the BCD operands increases. Also, the carry vector calculated is propagated through every bit position. The bit terms of the FINAL_CARRY vector must propagate through every bit position. As the bit position increases from least significant bit position 0 through most significant bit position 15, the number of logical terms required to produce the terms of the FINAL_CARRY vector also increases. Therefore, more sophisticated logic gates are required to produce the more significant bit terms and keep the number of logic levels and associated delay to a minimum.

For 16-bit BCD addition the BCD adder circuit of Adlietta et al uses only 12 gate levels compared to 22 gate levels in the BCD adder circuit of FIG. 1. But the logic terms required for the implementation of the FINAL_CARRY of BCD adder of Adlietta et al is much higher. Also, when the number of bits of the BCD operands increase, the logic terms for calculating the FINAL_CARRY also increases, which makes the implementation complex for more than 16-bits. There also is no reusability, meaning extending similar structures when the number of bits of the input BCD operands increases.

There remains a need for BCD addition circuits with lesser a number of gate levels as well as lesser number of logic terms without requiring any sophisticated logic gates. There is also a need to increase the reusability of logic gates in such adders.

SUMMARY

The binary coded decimal (BCD) adder circuit adds two BCD encoded operands, with an input carry bit, and produces a BCD encoded sum. The adder includes three stages. The first stage receives two BCD encoded operands as inputs, groups the inputs into contiguous blocks of 4-bits each, computes an intermediate sum vector and carry vector without considering the input carry bit, and also computes propagation and generate functions for each 4-bit group. The second stage is a carry look ahead circuit which computes all carries from the input carry, and the propagate and generate functions of the 4-bit groups from the first stage. The third stage adjusts the intermediate sum vector with, pre-correction factors which depend upon the input carry and the carries generated from the second stage and the carry vectors from the first stage.

This invention reduces the time required to perform a BCD addition by reducing in the number of gate levels of the critical path for adding two BCD operands of 16-bits each with an input carry to 12. Only 15 gate levels of delay arise for adding two 64-bit BCD encoded operands with an input carry. The gate levels thus increase only by three, from twelve to fifteen, when the input BCD operands bit size increases from sixteen to sixty-four.

Since the BCD addition is carried out with 4-bit groups, the same logic structure can be extended to provide a 16-, 32- or 64-bit BCD adder with extra levels of carry look ahead circuit, which increases the reusability of the logic.

DESCRIPTION OF DRAWINGS

FIG. 5 shows a circuit for calculating second intermediate sum and carry vectors.
FIG. 6 shows a circuit for calculating third intermediate sum and carry vectors.

DETAILED DESCRIPTION

Overview

Figure 1:
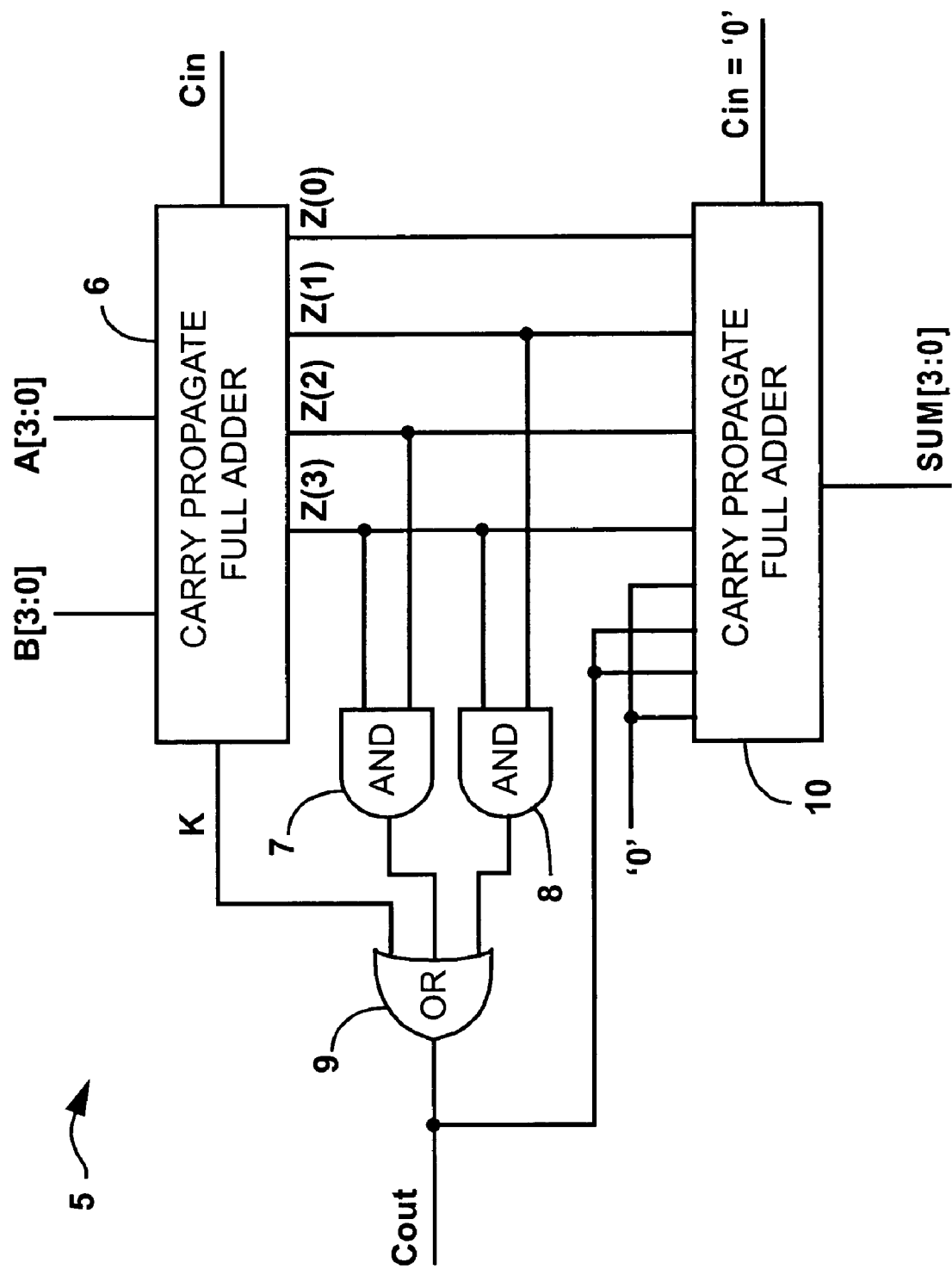
FIG. 1 shows a known BCD adder circuit.

The BCD addition of two operands each of n bits with an input carry bit will be described with reference to FIG. 2. A BCD adder circuit 12 generally has three stages, and the number of bits of the operands is n=16. The addition is performed after grouping the n-bits into contiguous (or successive) groups of 4-bits (i.e., bits 0-3, bits 4-7, bits 8-11, bits 12-15).

The first stage, represented by four circuits 13, 14, 15, 16, generates intermediate sum and carry vectors and propagate and generate functions. The second stage has a carry look ahead circuit 17 to generate carries from the input carry, and the propagate and generate functions from the first stage. The third stage includes four circuits 18, 19, 20, 21 that generate a final sum from the intermediate sum vectors based on pre-correction factors which depend on the input carry and the carries generated from carry look ahead circuit 17 and first stage circuits 13, 14, 15, 16.

First Stage

Consider the 16-bit BCD addition of two BCD encoded operands A(15) to A(0) and B(15) to B(0).

The addition of first group of 4-bits A(3) to A(0) and B(3) to B(0) by the circuit 13 is explained with reference to FIGS. 3, 4, 5 and 6. The circuits 14, 15, 16 for the other three groups of 4-bit addition logic are of the same form.

Figure 3:
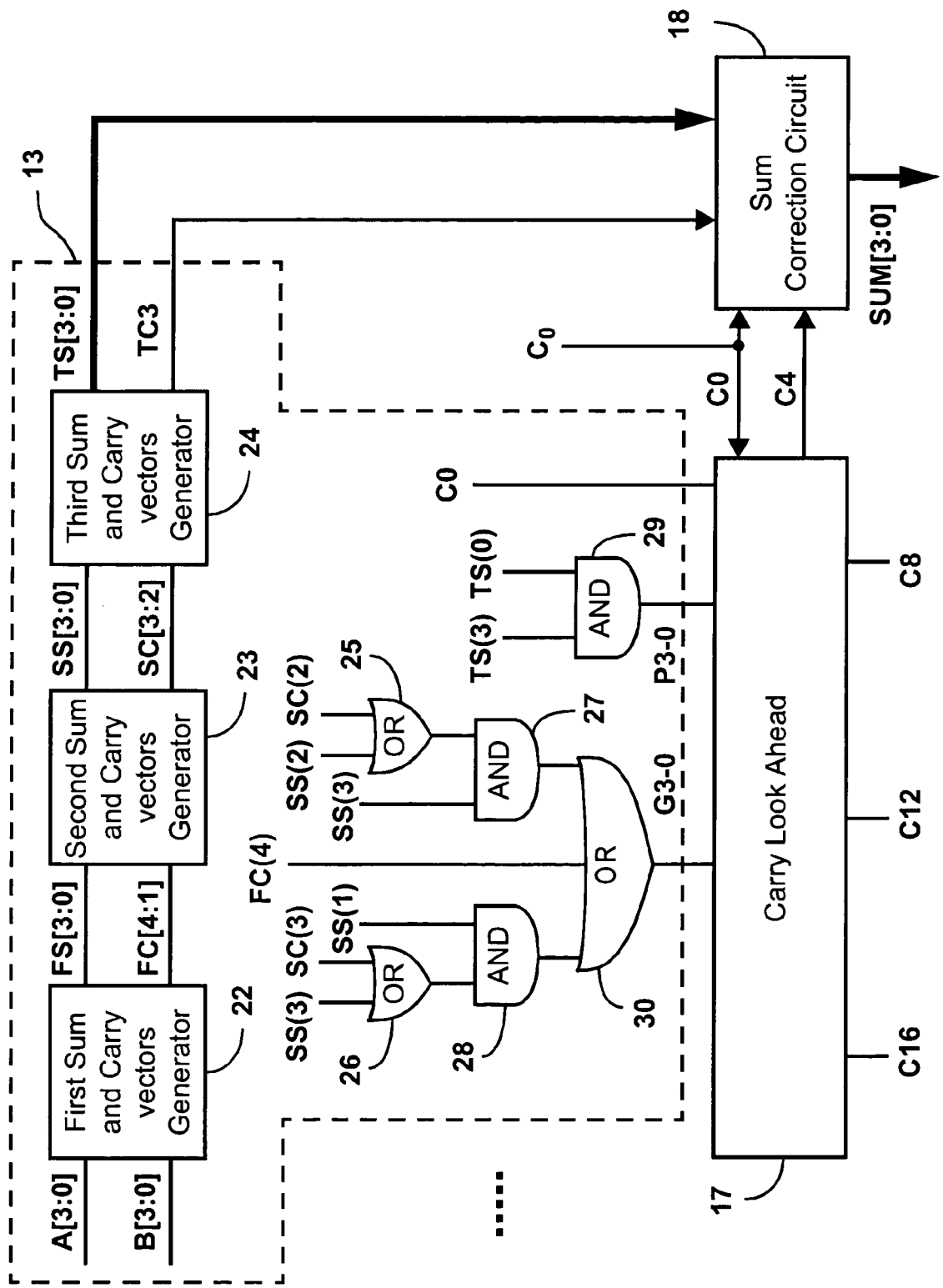
FIG. 3 shows detail of the circuit of FIG. 2 when an addition of a first group of bits is performed.

As shown in FIG. 3, three intermediate sum vectors FS[3:0], SS[3:0], and TS[3:0], (where "F"=first, "S"=second and "T"=third) and carry vectors FC[4:0], SC[3:0], TC3 to TC0 are calculated by sequential generator circuits 22, 23, 24. The third sum and carry vectors TS[3:0] and TC3 to TC0 are provided to a respective sum correction circuit 18 of the third stage.

Figure 4:
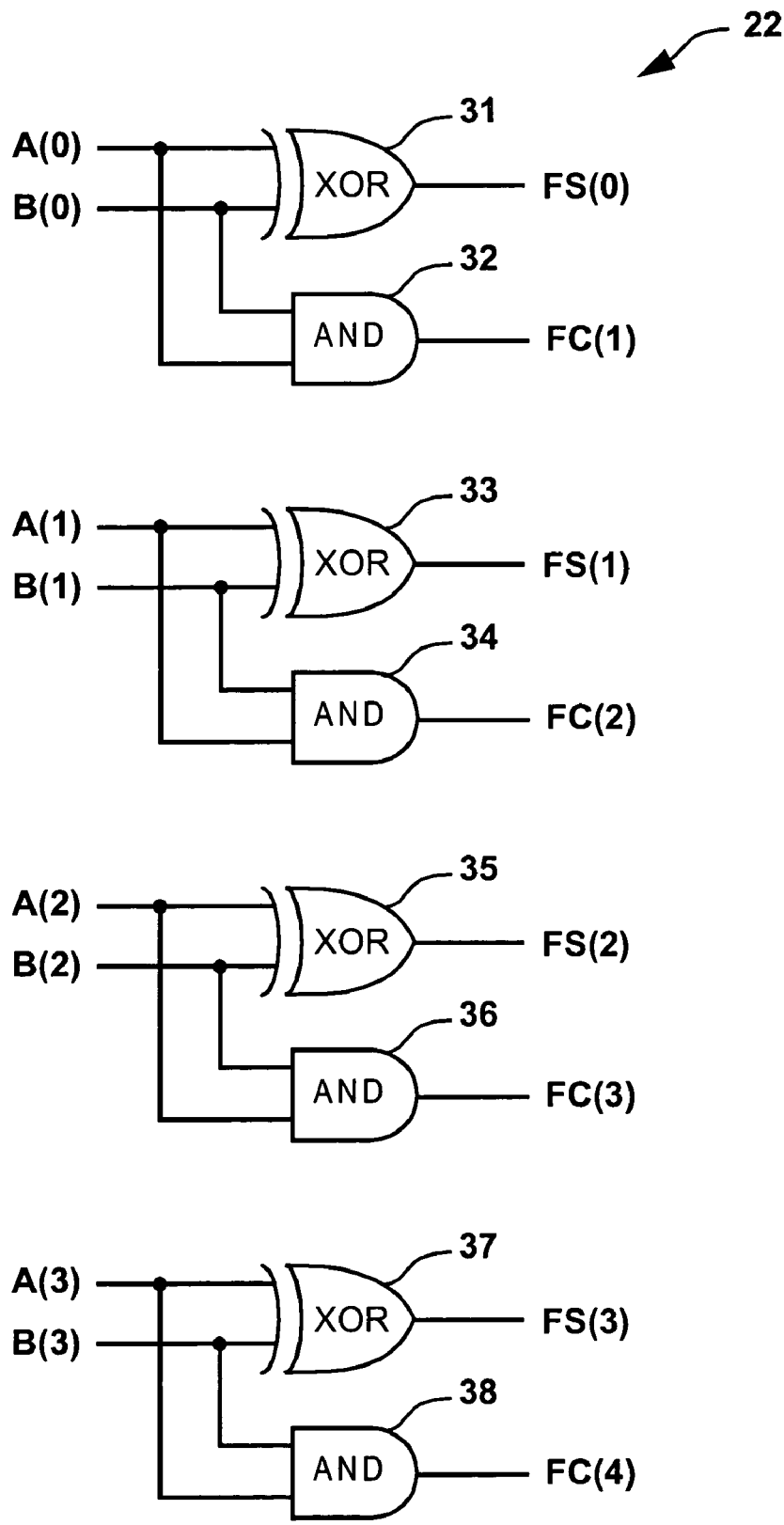
FIG. 4 shows a circuit for calculating first intermediate sum and carry vectors.

The circuit 22 computes the first intermediate sum vector FS(3) to FS(0) and carry vector FC(4) to FC(1) by Half-Adders (XOR and AND gates) as shown in FIG. 4. The logical operations performed are:

FS(3)=A(3) XOR B(3) (gate 37)
FS(2)=A(2) XOR B(2) (gate 35)
FS(1)=A(1) XOR B(1) (gate 33)
FS(0)=A(0) XOR B(0) (gate 31)
FC(4)=A(3) AND B(3) (gate 38)
FC(3)=A(2) AND B(2) (gate 36)
FC(2)=A(1) AND B(1) (gate 34)
FC(1)=A(0) AND B(0) (gate 32)
FC(0)='0'

The second intermediate sum vector of the first stage SS(3) to SS(0) and carry vector SC(3) to SC(2) are calculated by the circuit 23, including Half-Adders, as shown in detail in FIG. 5. The logical operations performed are:

SS(3)=FS(3) XOR FC(3) (gate 43)
SS(2)=FS(2) XOR FC(2) (gate 41)
SS(1)=FS(1) XOR FC(1) (gate 39)
SS(0)=FS(0) XOR FC(0)=FS(0); since FC(0)='0'
SC(3)=FS(2) AND FC(2) (gate 42)
SC(2)=FS(1) AND FC(1) (gate 40)
SC(1)=FS(0) AND '0'='0'; since FC(0)='0'
SC(0)='0'

The third intermediate sum vectors of the first stage TS(3) to TS(0) and a carry TC3 are calculated by the circuit 24, including Half-Adders, as shown in detail in FIG. 6. The logical operations performed are:

TS(3)=SS(3) XOR SC(3) (gate 46)
TS(2)=SS(2) XOR SC(2) (gate 44)
TS(1)=SS(1) XOR SC(1)=SS(1); since SC(1)='0'
TS(0)=SS(0) XOR SC(0)=FS(0); since SC(0)='0' and SS(0)=FS(0)
TC3=SS(2) AND SC(2) (gate 45)
TC2=SS(1) AND SC(1)='0'; since SC(1)='0'
TC1=SS(0) AND SC(0)='0'; since SC(0)='0'
TC0='0'

Comparing FIGS. 4-6, it can be seen that the design has been optimized such that Half-Adder circuits reduce to XOR gates or even to being straight through in some instances.

The propagate function P3-0 and the generate function G3-0 for the first group of 4-bits are calculated from the intermediate sum and carry vectors, by the combination logic shown in FIG. 3 represented by gates 25, 26, 27, 28, 29, 30. The logical operations performed are:

P3-0=TS(3) AND TS(0) (gate 30)
G3-0=(SS(1) AND (SS(3) OR SC(3))) OR (SS(3) AND (SS(2) OR SC(2))) OR FC(4) (gates 25, 26, 27, 28, 29)

Thus the functions P3-0 and G3-0, along with other 4-bit group propagate and generate functions P7-4, P11-8, P15-12, G7-4, G11-8 and G15-12, are inputs to the second stage carry look ahead circuit 17.

Second Stage

Figure 7:
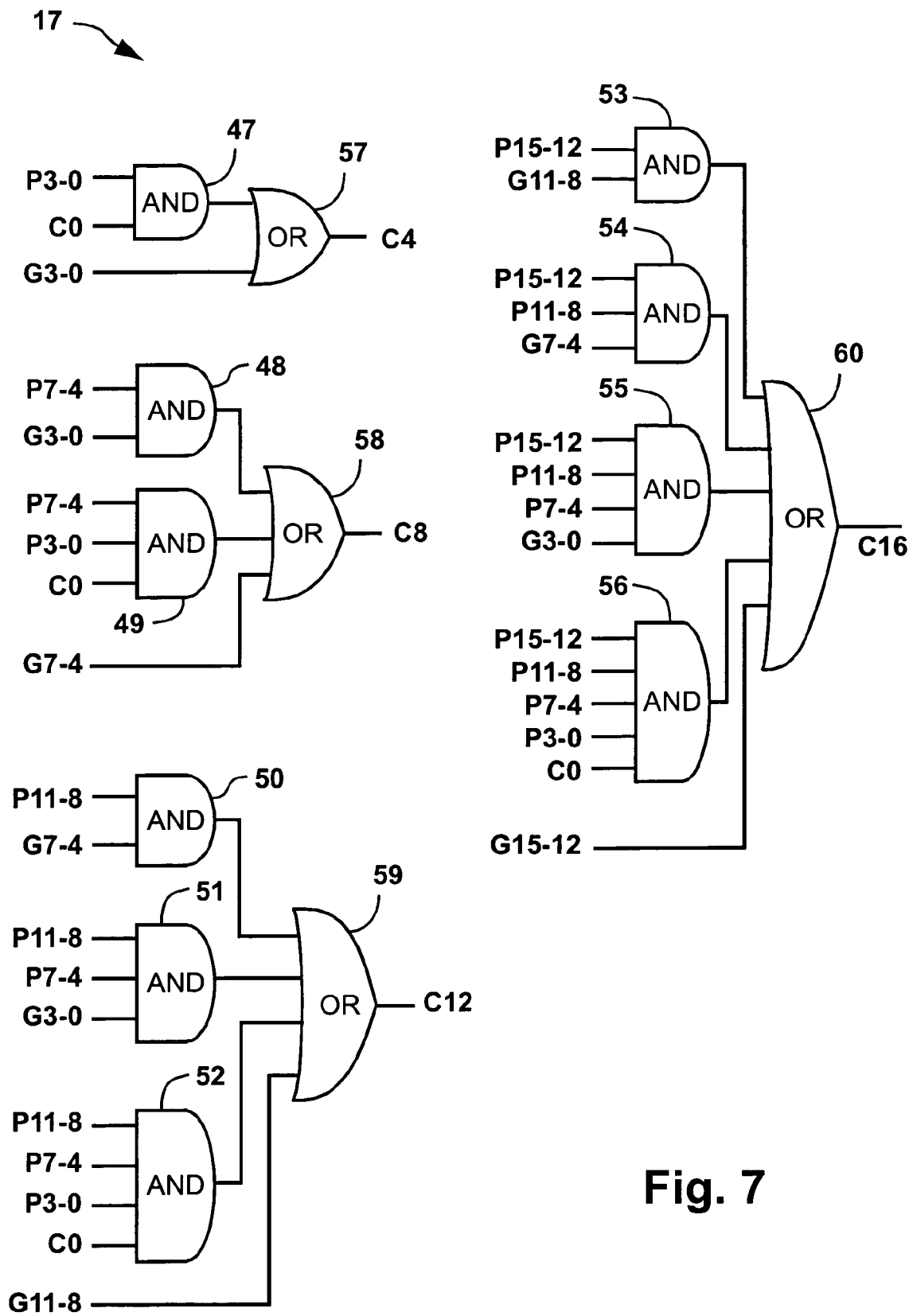
FIG. 7 shows a carry look ahead circuit.

The second stage carry look ahead circuit 17, calculates the carry values of all groups of 4-bits from the propagate and generate values of the first stage and the input carry bit C0 as shown in FIG. 7.

C4=G3-0 OR (P3-0 AND C0) (gates 47 and 57)
C8=G7-4 OR (P7-4 AND G3-0) OR (P7-4 AND P3-0 AND C0) (gates 48, 49 and/or gate 58)
C12=G1-8 OR (P11-8 AND G7-4) OR (P11-8 AND P7-4 AND G3-0) OR (P11-8 AND P7-4 AND P3-0 AND C0) (gates 50, 51, 52 and 59)
C16=G15-12 OR (P15-12 AND G11-8) OR (P15-12 AND P11-8 AND G7-4) OR (P15-12 AND P11-8 AND P7-4 AND G3-0) OR (P15-12 AND P11-8 AND P7-4 AND P3-0 AND C0) (gates 53, 54, 55, 56 and 60)

These carries are provided to the third stage.

The carry C16 will be calculated only for a 16-bit BCD addition. If 32-bit or 64-bit BCD addition is required, then propagate function P15-0 and generate function G15-0 will be produced instead of C16 to be provided as an input to the 64-bit carry look ahead network, shown in FIG. 13. The propagate and generate functions P15-0 and G15-0 are calculated as:

P15-0=P15-12 AND P11-8 AND P7-4 AND P3-0
G15-0=G15-12 OR (P15-12 AND G11-8) OR (P15-12 AND P11-8 AND G7-4) OR (P15-12 AND P11-8 AND P7-4 AND G3-0)

Figure 2:
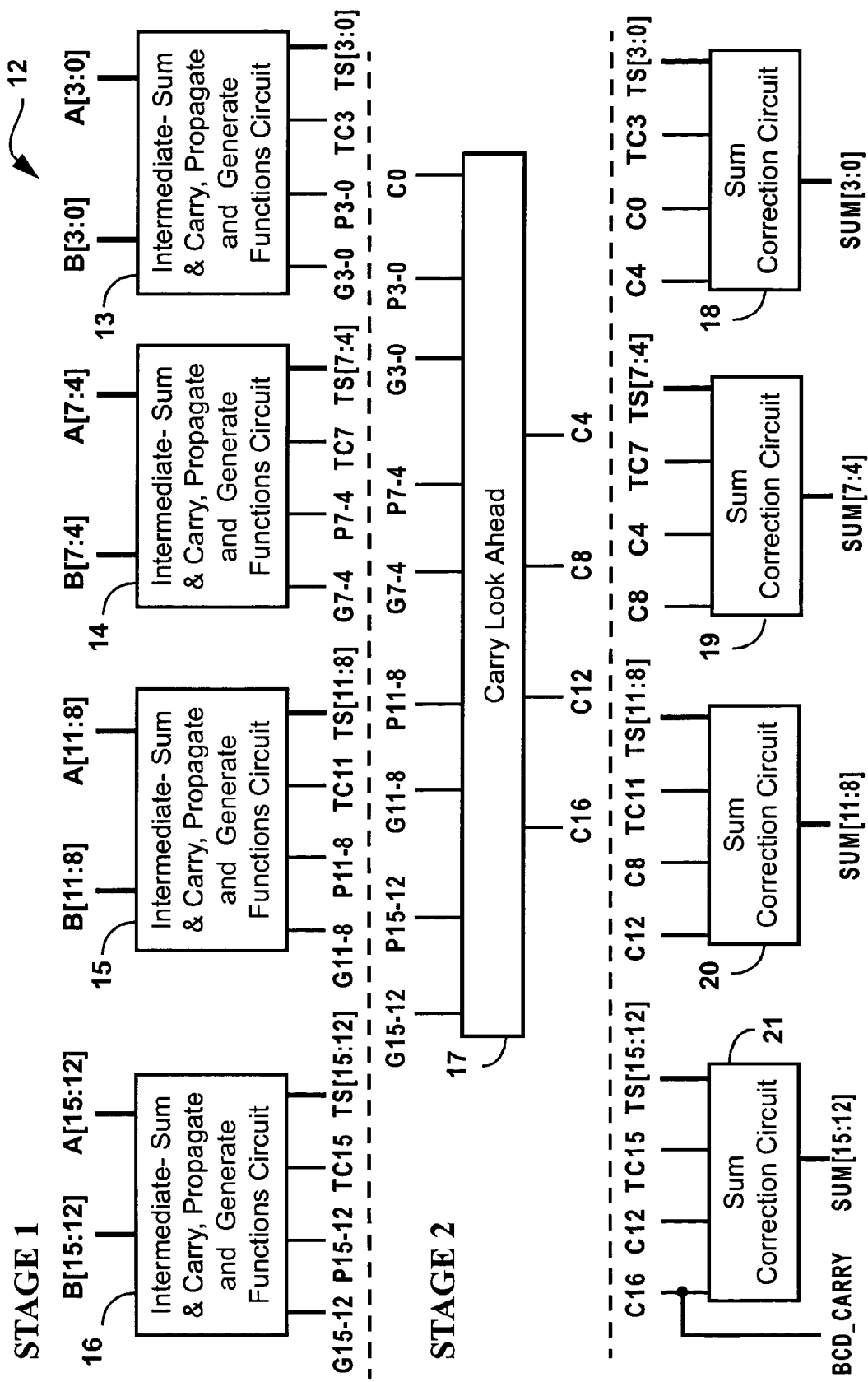
FIG. 2 shows a 16-bit BCD adder circuit embodying the invention.

The values P3-0, P7-4, P11-8 and P15-12 are propagate functions and G3-0, G7-4, G11-8 and G15-12 are generate functions from the first stage circuits 13, 14, 15 and 16 of FIG. 2.

Third Stage

The third stage circuits 18, 19, 20, 21 adjust the sum with pre-correction factors which depend on the carries generated from the first stage circuits 13, 14, 15, 16, the second stage carry look ahead circuit 17 and, in one case, the input carry C0.

In general, the sum correction for a 4-bit block(say N down to N−3) adds first stage 4-bit sum vector TS[N:N−3] and a pre-correction factor. The pre-correction factor is one of the values of $(TC_N000)_2$ or $(TC_N001)_2$ or $(TC_N110)_2$ or $(TC_N111)_2$ which will be decided based on the carry $C_{N-3}$ of previous 4-bits (N−4 down to N−7) and the carry $C_{N+1}$ of current 4 bits(N down to N−3).

For example, the general steps for sum correction block of bits 7 to 4 (where N=7) are:

Step 1

One of the values "$TC_7$ 0 0 0", "$TC_7$ 0 0 1", "$TC_7$ 1 1 0", "$TC_7$ 1 1 1" will be selected by C8 (Carry for bits 7 to 4) and C4 (carry of previous 4 bits i.e. bits 3 to 0).

if C8=0 and C4=0 => selection of TC₇000. (TC₇ is a single bit having value '1' or '0')
if C8=0 and C4=1 => selection of TC₇001
if C8=1 and C4=0 => selection of TC₇110
if C8=1 and C4=1 => selection of TC₇111

Step 2

The above selected value will be added with first stage SUM vector TS[N:N−3].

The first of the 4-bit group sum correction circuits, namely circuit 18, will now be explained in detail.

The inputs to the sum correction circuit 18 are the third intermediate sum vectors TS(3) to TS(0), the intermediate carry TC3 from the first stage the input carry C0 and the carry C4 from the second stage carry look ahead circuit 17.

If the Pre-correction Factor (PF) is taken as $PF(3)$ to $PF(0)$, and the intermediate sum is $TS(3)$ to $TS(0)$, then the Final Sum will be obtained from the following steps, which have four levels of calculations.

In the first level, a First Correction Sum vector FCS and a First Correction Carry vector FCC are calculated from the PF vector (PF(3) to PF(0)) and the TS vector (TS(3) to TS(0)) as shown in Table 1.

TABLE 1

| First_Correction_Sum | First_Correction_Carry |
| --- | --- |
| FCS(3) = TS(3) XOR PF(3) | FCC(3) = TS(2) AND PF(2) |
| FCS(2) = TS(2) XOR PF(2) | FCC(2) = TS(1) AND PF(1) |
| FCS(1) = TS(1) XOR PF(1) | FCC(1) = TS(0) AND PF(0) |
| FCS(0) = TS(0) XOR PF(0) | FCC(0) = '0' |

In the second level, a Second Correction Sum SCS and a Second Correction Carry SCC are calculated from first level outputs FCS(3) to FCS(0) and FCC(3) to FCC(3) as shown in Table 2.

TABLE 2

| Second_Correction_Sum | Second_Correction_Carry |
| --- | --- |
| SCS(3) = FCS(3) XOR FCC(3) | SCC(3) = FCS(2) AND FCC(2) |
| SCS(2) = FCS(2) XOR FCC(2) | SCC(2) = FCS(1) AND FCC(1) |
| SCS(1) = FCS(1) XOR FCC(1) | SCC(1) = FCS(0) AND FCC(0) |
| SCS(0) = FCS(0) XOR FCC(0) | SCC(0) = '0' |

In the third level, a Third Correction Sum TCS and Third Correction Carry TCC are calculated from second level outputs SCS(3) to SCS(0) and SCC(3) to SCC(0) as shown in Table 3.

TABLE 3

| Third_Correction_Sum | Third_Correction_Carry |
| --- | --- |
| TCS(3) = SCS(3) XOR SCC(3) | TCC(3) = SCS(2) AND SCC(2) |
| TCS(2) = SCS(2) XOR SCC(2) | TCC(2) = SCS(1) AND SCC(1) |
| TCS(1) = SCS(1) XOR SCC(1) | TCC(1) = SCS(0) AND SCC(0) |
| TCS(0) = SCS(0) XOR SCC(0) | TCC(0) = '0' |

In the fourth level, a final SUM vector is calculated from the third level outputs TCS(3) to TCS(0) and TCC(3) to TCC(3) as shown in Table 4.

TABLE 4

| Final_Sum |
| --- |
| SUM(3) = TCS(3) XOR TCC(3) |
| SUM(2) = TCS(2) XOR TCC(2) |
| SUM(1) = TCS(1) XOR TCC(1) |
| SUM(0) = TCS(0) XOR TCC(0) |

As mentioned, the Pre-correction Factor $PF(3)$ to $PF(0)$ is, in part, dependent upon the carries C0 and C4. The Pre-correction Factor $PF(3)$ to $PF(0)$ is given below for each of four cases:

If the C4='0' and C0='0', the PF(3) to $PF(0)$ is
(TC3 0 0 0)                    Case1

If the C4='0' and C0='1', the PF(3) to $PF(0)$ is
(TC3 0 0 1)                    Case2

If the C4='1' and C0='0', the PF(3) to $PF(0)$ is
(TC3 1 1 0)                    Case3

If the C4='1' and C0='1', the PF(3) to $PF(0)$ is
(TC3 1 1 1)                    Case4

Case 1

The final SUM vector is obtained after substituting PF(3) to PF(0) values (TC3 0 0 1) in the First_Sum_Correction and First_Carry_Correction equations and then reducing the Second_Sum_Correction, Second_Carry_Correction, Third_Sum_Correction and Third_Carry_Correction equations. The finally reduced SUM vector is given below:

$$SUM(3)=TS(3) \text{ XOR } TC3 \qquad \text{equ03}$$

$$SUM(2)=TS(2) \qquad \text{equ02}$$

$$SUM(1)=TS(1) \qquad \text{equ01}$$

$$SUM(0)=TS(0) \qquad \text{equ00}$$

Case 2

The final SUM vector is obtained after substituting PF(3) to PF(0) values (TC3 0 0 1) in the First_Sum_Correction and First_Carry_Correction equations and then reducing the Second_Sum_Correction, Second_Carry_Correction, Third_Sum_Correction and Third_Carry_Correction equations. The finally reduced SUM vector is given below:

$$SUM(3)=TS(3) \text{ XOR } TC3 \text{ XOR } (TS(0) \text{ AND } TS(1) \text{ AND } TS(2)) \qquad \text{equ13}$$

$$SUM(2)=(TS(0) \text{ AND } TS(1)) \text{ XOR } TS(2) \qquad \text{equ12}$$

$$SUM(1)=TS(0) \text{ XOR } TS(1) \qquad \text{equ11}$$

$$SUM(0)=NOT \; TS(0) \qquad \text{equ10}$$

Case 3

The final SUM vector is obtained after substituting PF(3) to PF(0) values (TC3 1 1 0) in the First_Sum_Correction and First_Carry_Correction equations and then reducing the Second_Sum_Correction, Second_Carry_Correction, Third_Sum_Correction and Third_Carry_Correction equations. The finally reduced SUM vector is given below:

$$SUM(3)=TS(3) \text{ XOR } TC3 \text{ XOR } (TS(1) \text{ OR } TS(2)) \qquad \text{equ23}$$

$$SUM(2)=TS(1) \text{ XOR } (NOT \; TS(2)) \qquad \text{equ22}$$

$$SUM(1)=NOT \; TS(1) \qquad \text{equ21}$$

$$SUM(0)=TS(0) \qquad \text{equ20}$$

Case 4

The final SUM vector is obtained after substituting PF(3) to PF(0) values (TC3 1 1 1) in the First_Sum_Correction and First_Carry_Correction equations and then reducing the Second_Sum_Correction, Second_Carry_Correction, Third_Sum_Correction and Third_Carry_Correction equations. The finally reduced SUM vector is given below $$SUM(3)=TS(3) \text{ XOR } TC(3) \text{ XOR } (TS(0) \text{ OR } TS(1) \text{ OR } TS(2)) \quad \text{equ33}$$

$$SUM(2)=(TS(0) \text{ OR } TS(1)) \text{ XOR}(\text{NOT } TS(2)) \quad \text{equ32}$$

$$SUM(1)=TS(0) \text{ XOR } (\text{NOT } TS(1)) \quad \text{equ31}$$

$$SUM(0)=\text{NOT } TS(0) \quad \text{equ30}$$

Figure 8:
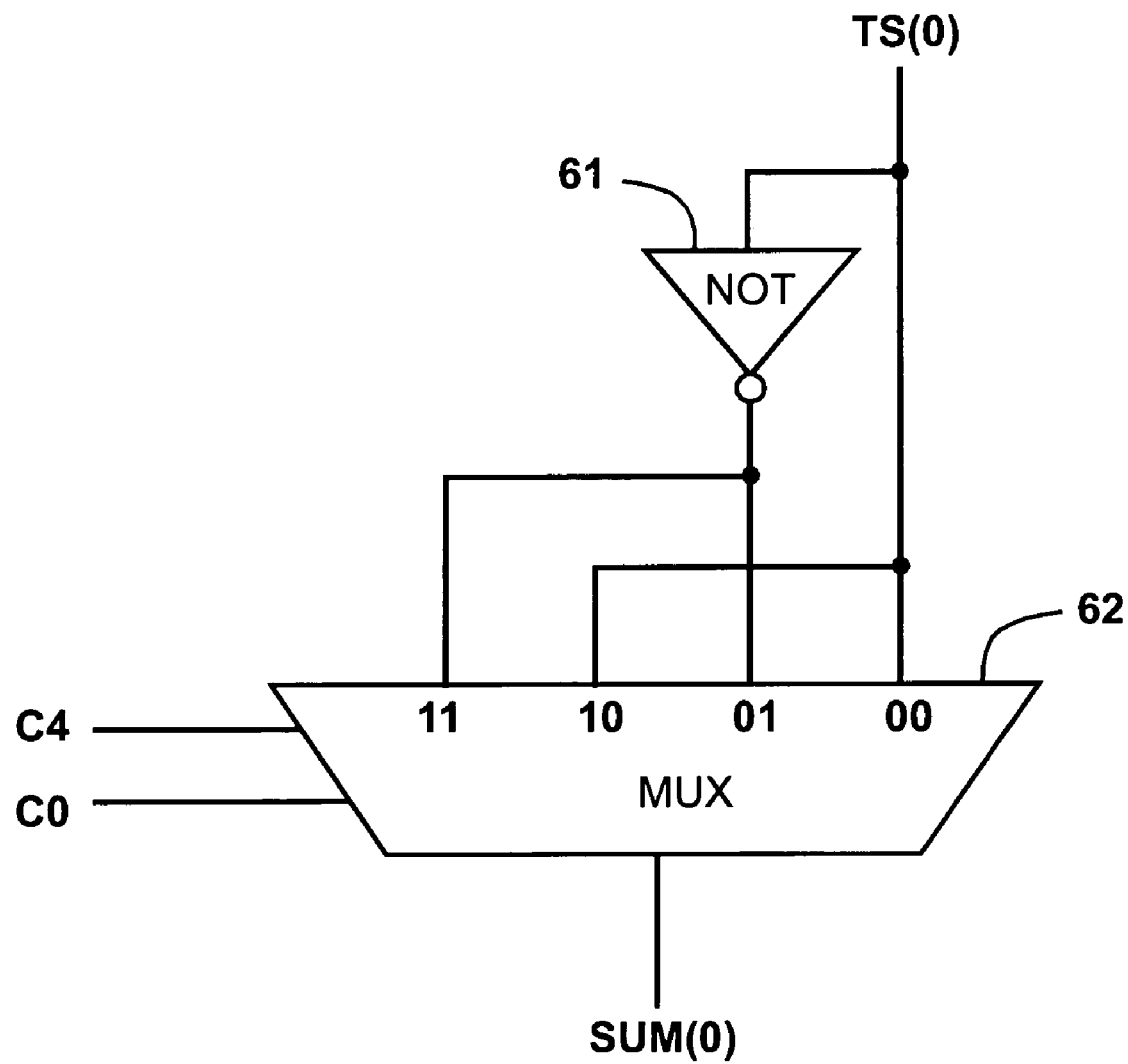
FIG. 8 shows a circuit for performing a SUM(0) correction.
Figure 9:
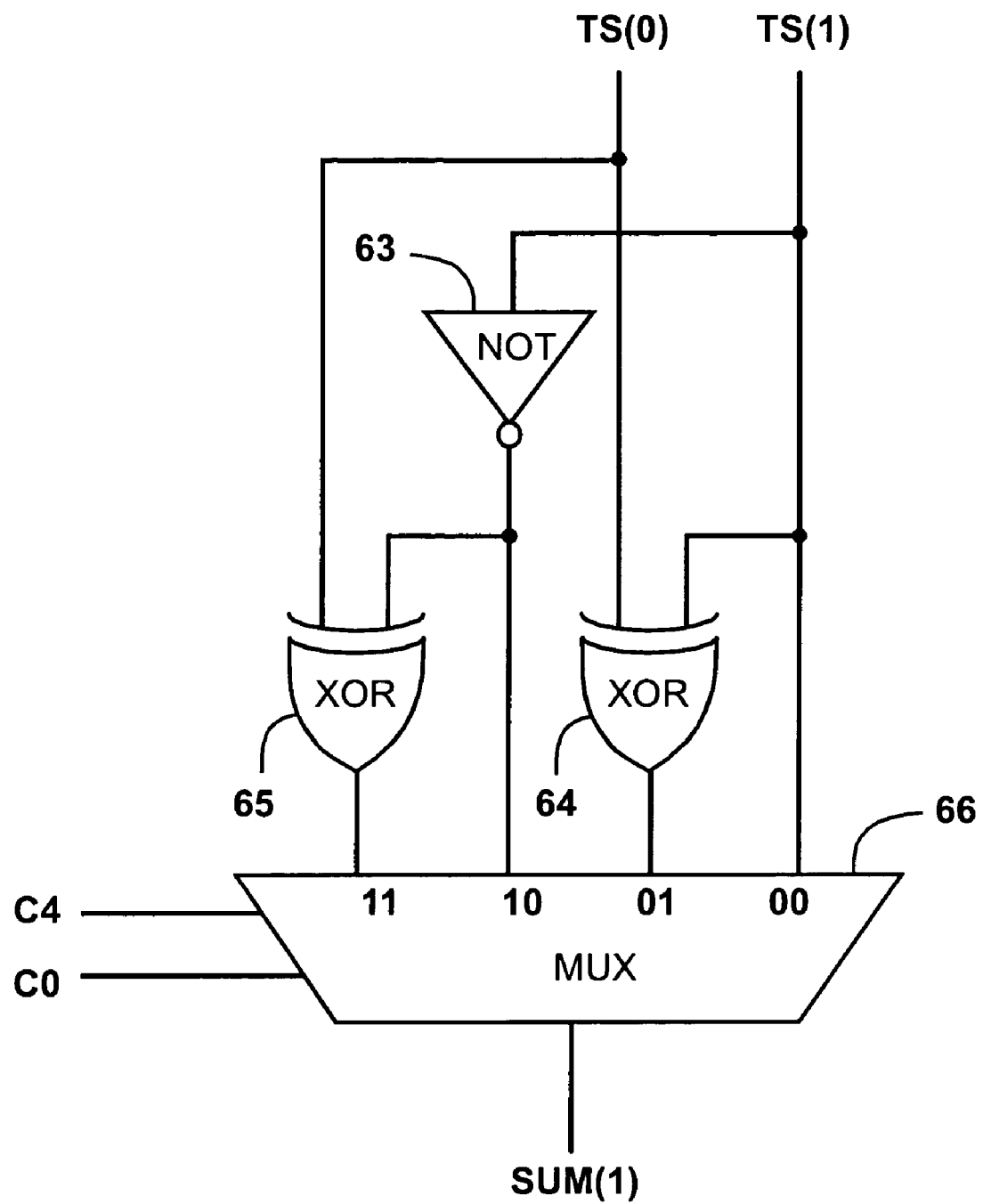
FIG. 9 shows a circuit for performing a SUM(1) correction.
Figure 10:
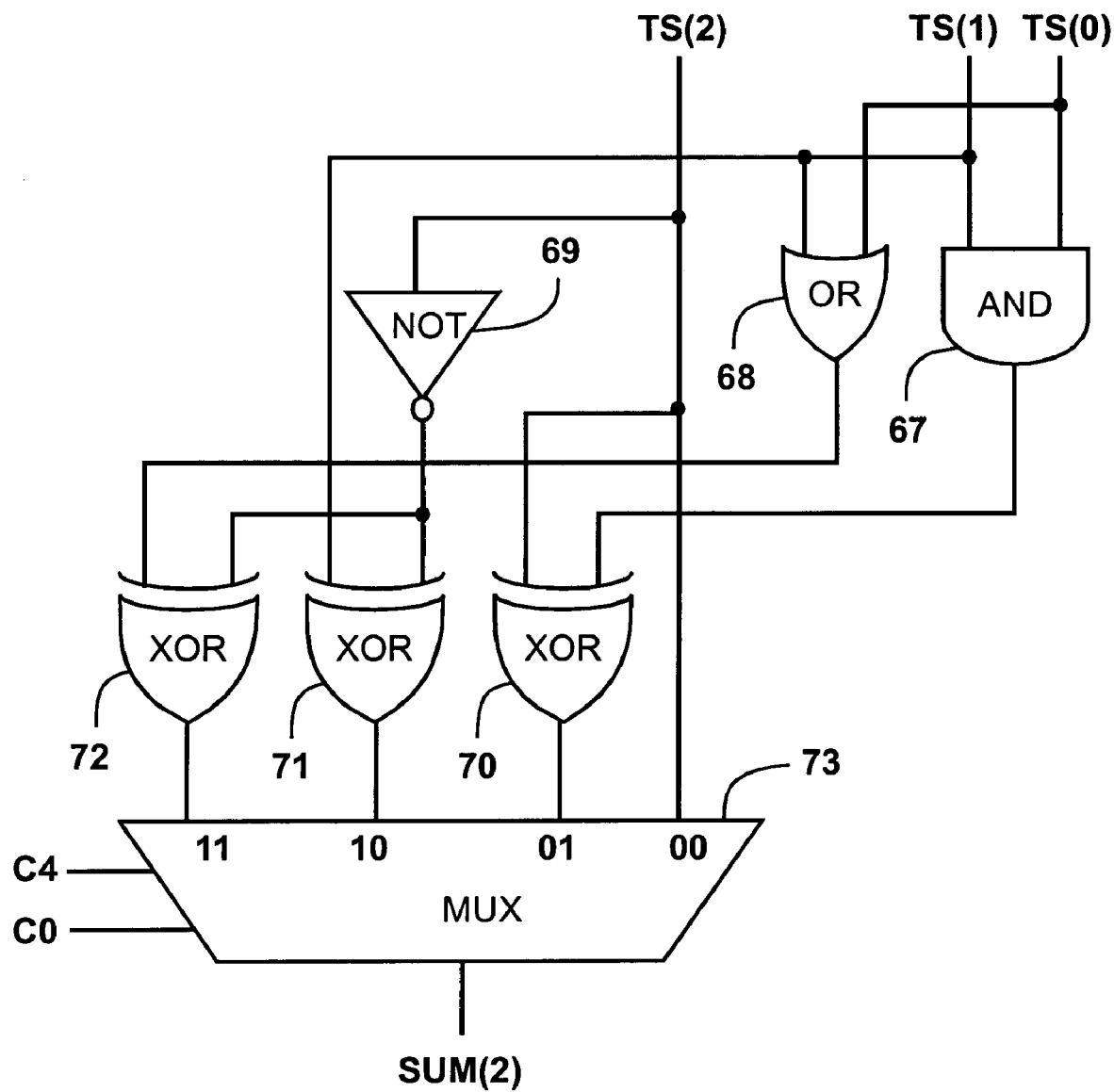
FIG. 10 shows a circuit for performing a SUM(2) correction.
Figure 11:
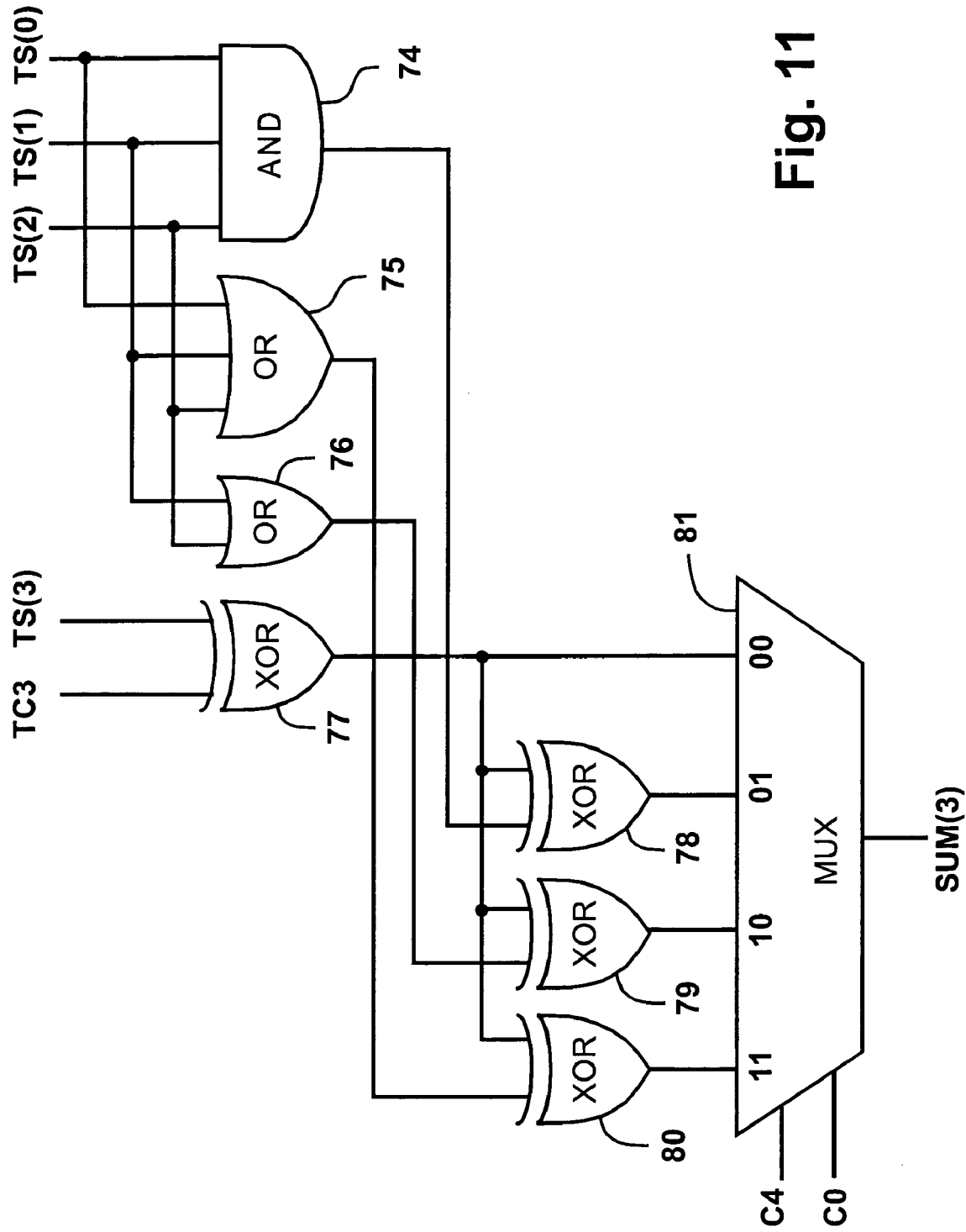
FIG. 11 shows a circuit for performing a SUM(3) correction.

The implementation of SUM(0) correction circuit from equ00, equ10, equ20 and equ30 is shown in FIG. 8. The implementation of SUM(1) correction circuit from equ01, equ11, equ21 and equ31 is shown in FIG. 9. The implementation of SUM(2) correction circuit from equ02, equ12, equ22 and equ32 is shown in FIG. 10. The implementation of SUM(3) correction circuit from equ03, equ13, equ23 and equ33 is shown in FIG. 11.

Clearly, there are equivalent circuits to those shown in FIGS. 8-11 for each of the other sum correction circuits 19, 20, 21, to generate SUM[7:4], SUM[11:8], and SUM[15:12] values.

Final Sum

The Final Sum of the BCD addition is the sequence of SUM[15:12], SUM[11:8], SUM[7:4], SUM [3:0]. A final carry, equal to C16, also results as an output.

Critical Paths

In the BCD addition circuit 12 as described, there are a number of critical paths in the three stages. Critical paths determine the number of logic levels required, and the speed at which addition can be performed.

Critical Paths in the First Stage:

CRITICAL_PATH_1—The path through circuits 22, 23 and 24 which generates intermediate sum vector TS(3) to TS(0) from the BCD input operands A(3) to A(0) and B(3) to B(0) contains three XOR gates, and so the gate levels for this critical path is considered as 6.

CRITICAL_PATH_2a—The path through circuits 22, 23 and gates 26, 28, 30 from the BCD input operands to the generate function requires 7 gate levels.

CRITICAL_PATH_2b—The path through circuits 22, 23 and gates 25, 27, 30 from the BCD input operands to the generate function requires 7 gate levels.

CRITICAL_PATH_2c—The path through circuits 22, 23, 24 and gate 29 from the BCD input operands to the propagate function requires 7 gate levels.

Critical Paths in the Second Stage:

CRITICAL_PATH_3—The carry look ahead circuit for 16-bit BCD addition (circuit 17 in FIG. 3) requires two gate levels of logic.

Critical Paths in the Third Stage:

CRITICAL_PATH_4—The SUM correction circuit's critical path (gates 77, 78 and MUX 81 of FIG. 11) from first stage output intermediate sum vector to final SUM vector requires 6 levels of gates, of which 4 levels are calculated before receiving the carries from the carry look ahead circuit 17.

CRITICAL_PATH_5—The path from the carry look ahead output carries to the final SUM which has 2 gate levels (MUX 62 or MUX 66 or MUX 73 or MUX 81).

In the case of the 16-bit BCD adder circuit, the critical path is through SUM correction circuit and the path is CRITICAL_PATH_1 (6 gate levels)+CRITICAL_PATH_4 (6 gate levels). So the 16-bit BCD adder circuit has a delay of only 12 gate levels.

In the case of a 64-bit or 32 bits BCD adder circuit, the critical path is through the Carry look ahead circuit and the path is CRITICAL_PATH_2a or CRITICAL_PATH_2b or CRITICAL_PATH_2c (all are 7 gate levels)+CRITICAL_PATH_3 (6 gate levels)+CRITICAL_PATH_5 (2 gate levels). Therefore, 64-bit or 32-bit BCD adder circuits have 15 gate levels of logic in the critical path.

The 64-Bit Adder Circuit

The 16-bit BCD adder of FIG. 2 can be extended to a 32-bit or 64-bit form with extra carry look ahead network levels.

Figure 12:
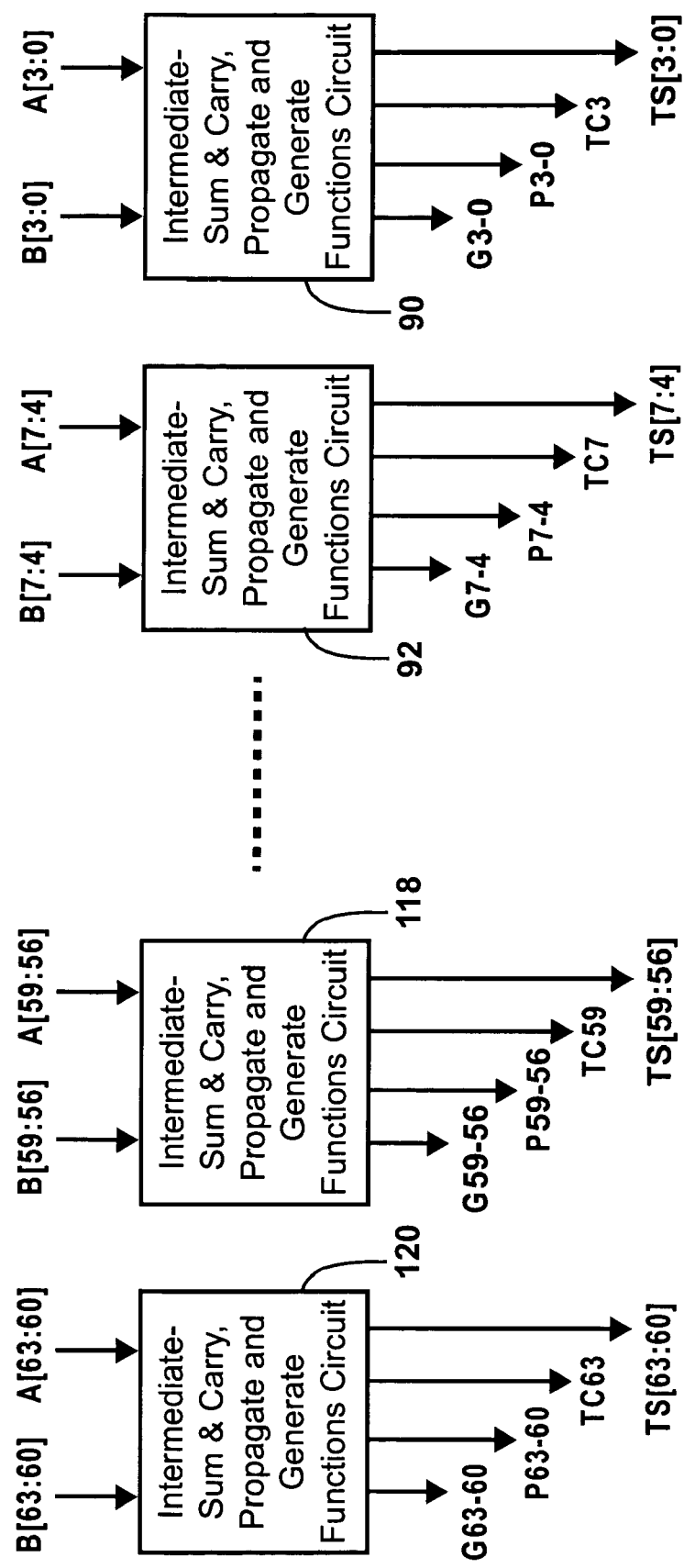
FIG. 12 shows a stage 1 circuit for a 64-bit BCD adder circuit.

A 64-bit BCD adder circuit includes three stages as discussed with reference to the 16-bit adder 12 shown in FIG. 2. As shown in FIG. 12, Stage 1 has sixteen logic circuits 90, 92, ..., 118, 120 of the type identified by numeral 13 in FIG. 3.

The circuits 90-120 receive contiguous 4-bit operands A[3:0] and B[3:0], A[7:4] and B[7:4], and so on, and generate respective intermediate sums TS[3:0], ... TS[63:60], intermediate carries TC3, ..., TC63, propagate functions P3-0, ..., P63-60, and generate functions G3-0, ..., G63-60.

Figure 13A:
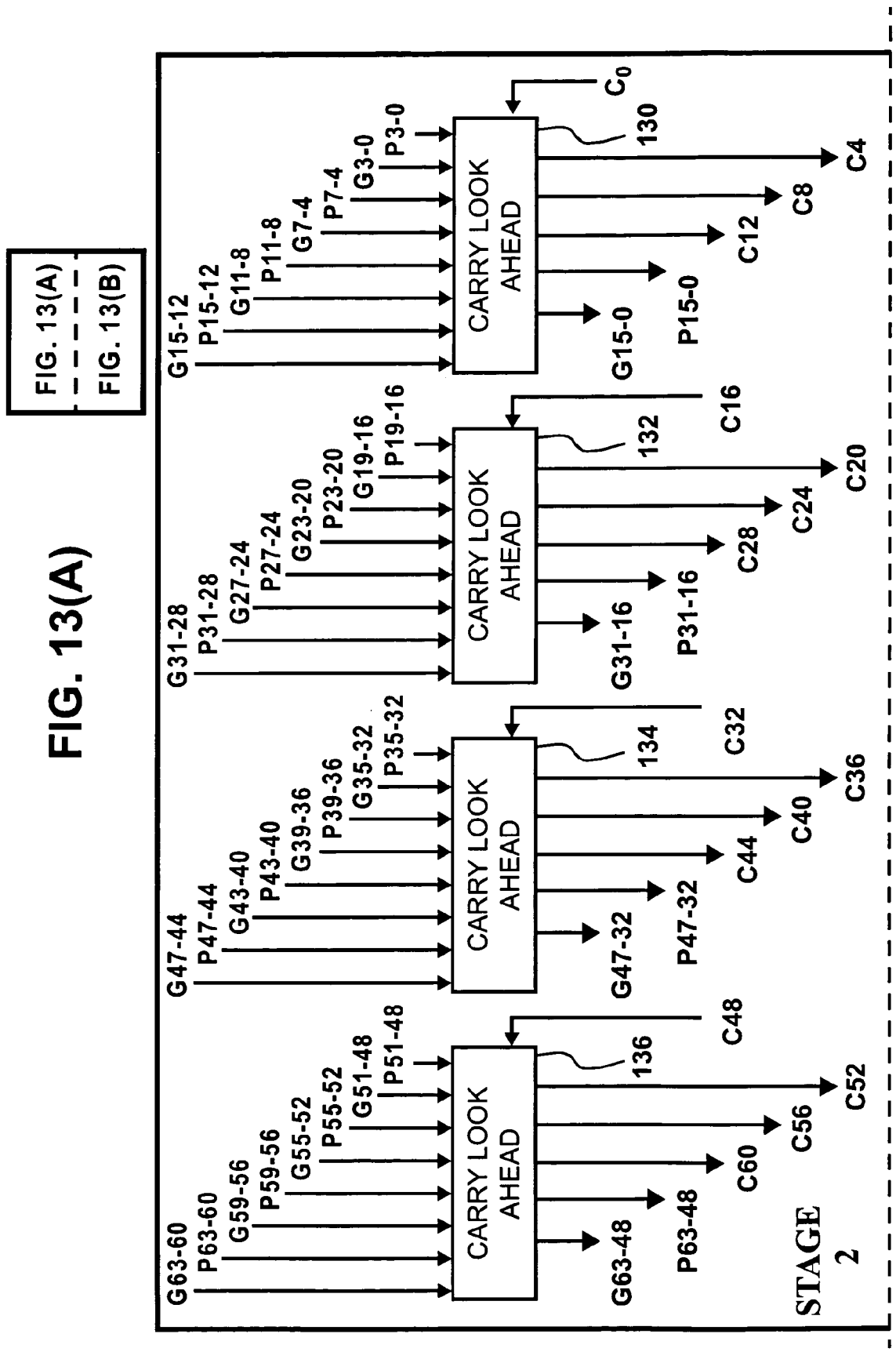
FIG. 13 shows a carry look ahead circuit for the 64-bit BCD adder circuit.
Figure 13B:
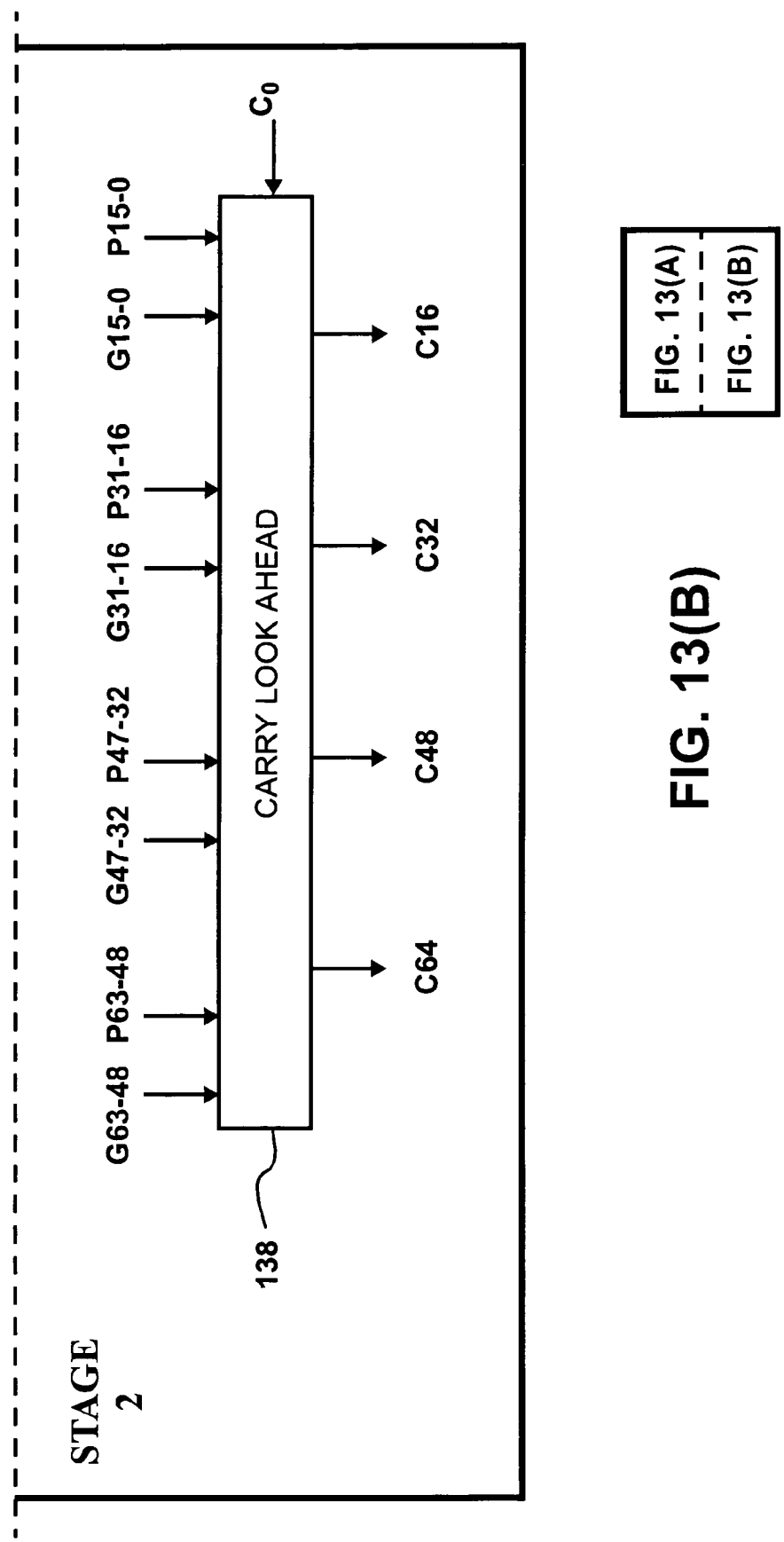

The second stage carry look ahead circuits are shown in FIG. 13. Five carry look ahead circuits 130, 132, 134, 136, 138 are required. These circuits are of the same for as the circuit 17 shown in FIG. 7.

The carry look ahead circuits are in two sub-stages: four circuits 130, 132, 134, 136 coupled with the first stage circuits 90-120 to receive 4-bit propagate and generate functions, and a single circuit 138, receiving 16-bit propagate and generate functions from the first sub-stage. The outputs from the second sub-stage to the third stage are the carries C16, C32, C48, and C64.

Figure 14:
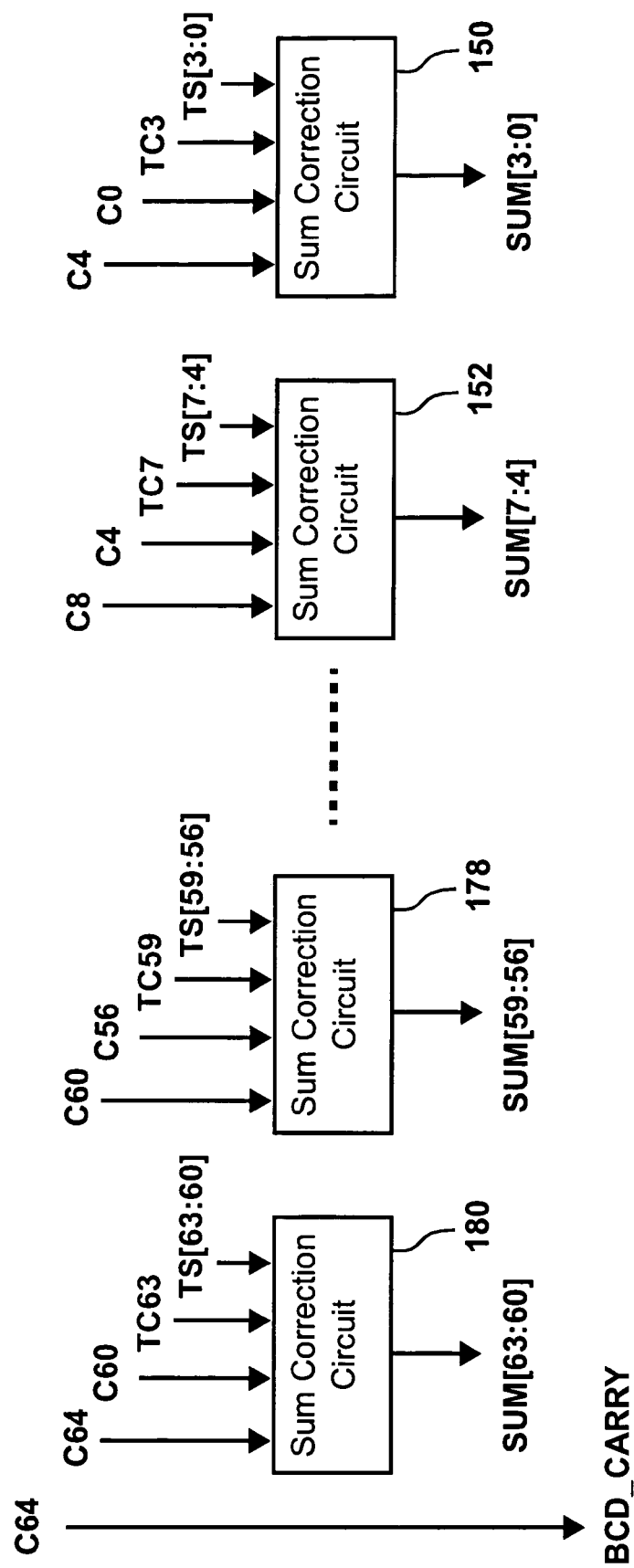
FIG. 14 shows a sum correction circuit for the 64-bit BCD adder circuit.

The third stage, shown in FIG. 14 has sixteen sum correction circuits 150, 152, ..., 178, 180. Each of these circuits is implemented in the same manner as, for example, sum correction circuit 18 described with reference to FIGS. 8-11. Together, the sum correction circuits 150-180 calculate SUM[3:0] to SUM [63:60] giving the sum result of the operands A[63:0]+B[63:0]+$C_0$. The final carry is the value C64.

The 64-bit or 32-bit BCD adder requires six gate levels as shown in FIG. 13 (circuits 130, 132, 134, 136 and 138) in the second stage critical path.

The extension from 16-bit to 64-bit addition can be achieved with high reusability. A 64-bit adder circuit can be built by extending (i.e. reusing) the components of a 16-bit circuit four times, and adding only one extra level of a carry look ahead circuit.

Conclusion

The circuit described reduces the number of gate levels in the addition of two BCD-encoded operands with an input carry and makes the BCD addition fast.

While the invention contemplates equal length blocks for the operands, the embodiment taught is 4-bit blocks. For the 16-bit adder, the blocks are of contiguous bits from the least to most significant bits. The use of 4-bit blocks is the most preferred, however, in that the fan-in and fan-out of carry look ahead logic is the least onerous to implement in hardware.

Various alterations and modifications can be made to the techniques and arrangements described herein, as would be apparent to one skilled in the relevant art.

We claim:

1. A binary coded decimal adder circuit for adding two operands and an input carry to give a sum comprising:
    a first stage receiving said operands, grouping said operands into equal length blocks of contiguous bits and, for each said block, logically computing from said operands an intermediate sum vector, an intermediate carry vector, a propagate function and a generate function;
    a second stage receiving said input carry and receiving from each said block of said first stage the respective propagate function and generate function, and carry look ahead computing therefrom carries for each said block and an output carry; and
    a third stage, having the same number of blocks as said first stage, each third stage block receiving a respective intermediate sum vector, and logically adjusting said intermediate sum vector by pre-correction factors which depend upon a respective intermediate carry vector, at least two of the one of said second stage carries and said input carry; and
    wherein outputs of said third stage logic blocks together represent said sum of operands.

2. The adder circuit of claim 1, wherein said blocks are 4-bits in length.

3. The adder circuit of claim 1, wherein said operands are of 16-bit length, and further wherein:
    said first stage has a like logic circuit for each 4-bit block;
    said second stage has a single carry look ahead logic circuit; and
    said third stage has a like sum correction logic circuit for each 4-bit block.

4. The adder circuit of claim 1, wherein said operands are of 64-bit length, and further wherein:
    said first stage has a like logic circuit for each 4-bit block;
    said second stage has a first carry look ahead level of four carry look ahead logic circuits providing partial carries to a second carry look ahead level of a single carry look ahead circuit; and
    said third stage has a like sum correction circuit for each 4-bit block.

5. The adder circuit of claim 1, wherein said pre-correction factors are calculated depending upon four cases of the logical combinations of two carries.

6. The adder circuit of claim 5, wherein said pre-correction factors include the carry from the intermediate carry vector and a bit pattern depending upon the relevant one of said four cases.

7. The adder circuit of claim 1, wherein said intermediate sum vector and said intermediate carry vector are computed by three cascaded Half-Adder circuits.

8. The adder circuit of claim 1, wherein said pre-correction factors include one of four values decided on the basis of a carry from a preceding block and a carry from the current block.

9. A binary coded decimal adder circuit for adding two 4N-bit operands and an input carry to give a sum comprising:
    a first stage receiving said operands, grouping said operands into N contiguous 4-bit length blocks and, for each said block, logically computing from said operands an intermediate sum vector, an intermediate carry vector, a propagate function and a generate function;
    a second stage receiving said input carry and receiving from each said block of said first stage the respective propagate function and generate function, and carry look ahead computing therefrom carries for each said block and an output carry; and
    a third stage, having the same number of blocks as said first stage, each third stage block receiving a respective intermediate sum vector, and logically adjusting said intermediate sum vector by pre-correction factors which depend upon a respective intermediate carry vector, at least two of the one of said second stage caries and said input carry; and
    wherein outputs of said third stage logic blocks together represent said sum of operands.

10. The adder circuit of claim 9, wherein said pre-correction factors are calculated depending upon four cases of the logical combinations of two carries.

11. The adder circuit of claim 10, wherein said pre-correction factors include the carry from the intermediate carry vector and a bit pattern depending upon the relevant one of said four cases.

12. The adder circuit of claim 10, wherein said pre-correction factors are calculated from the carry $C_{N-3}$ of the previous 4-bits and the carry $C_{N+1}$ of the current 4-bits.

13. The adder circuit of claim 9, wherein said intermediate sum vector and said intermediate carry vector are computed by three cascaded Half-Adder circuits.

* * * * *